Figure 6:
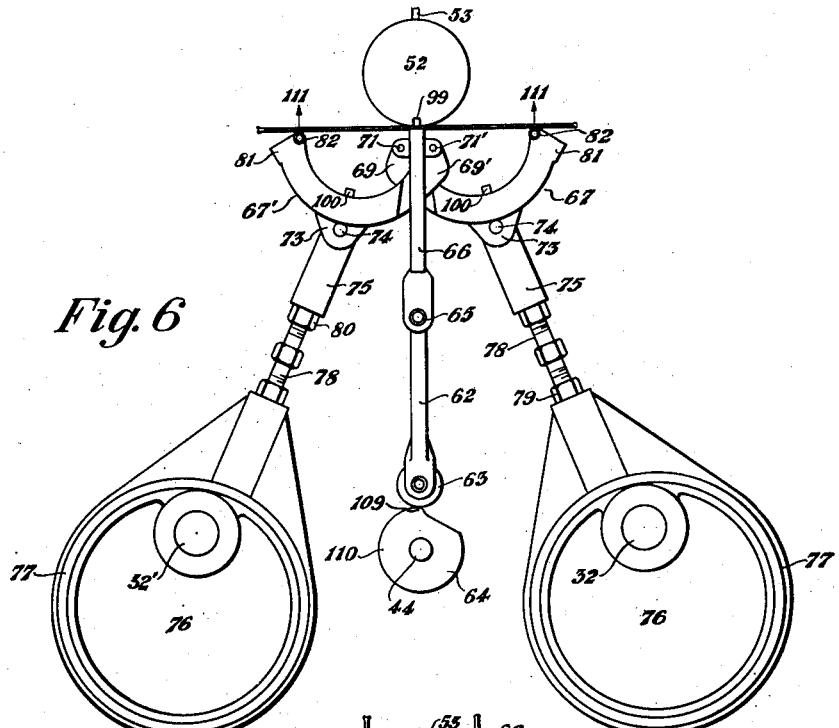

Feb. 28, 1933.  C. A. FRAHM ET AL  1,899,143
TUBE MANUFACTURE
Filed Feb. 18, 1929   6 Sheets-Sheet 1
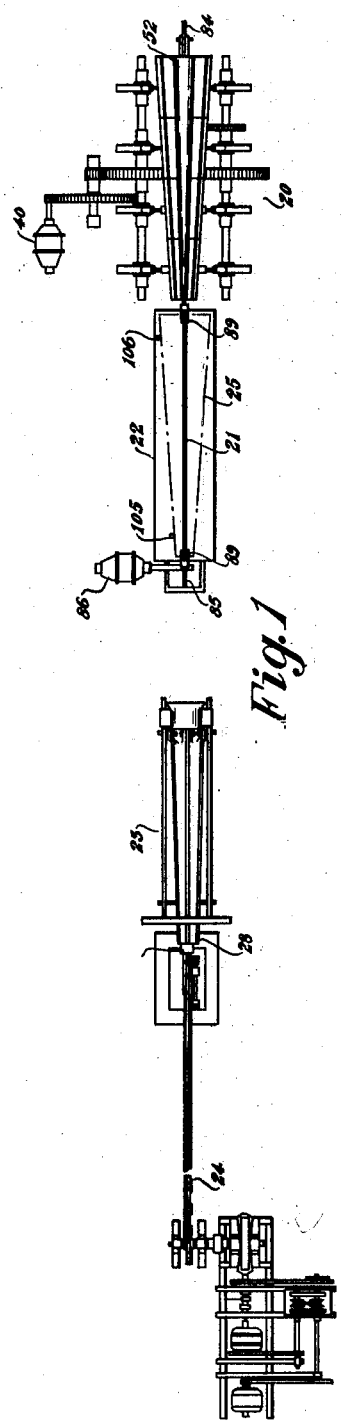
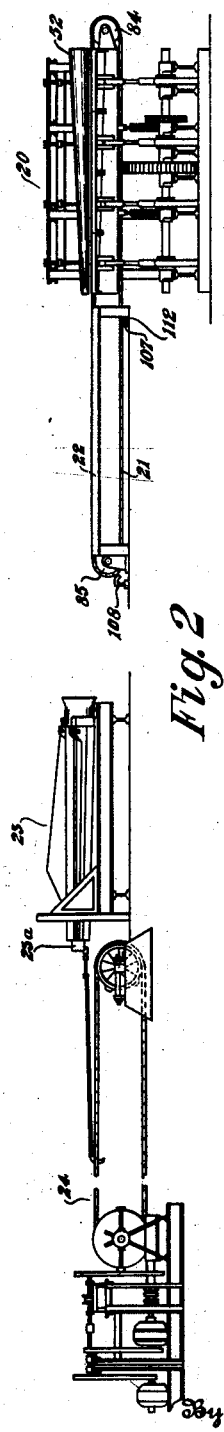
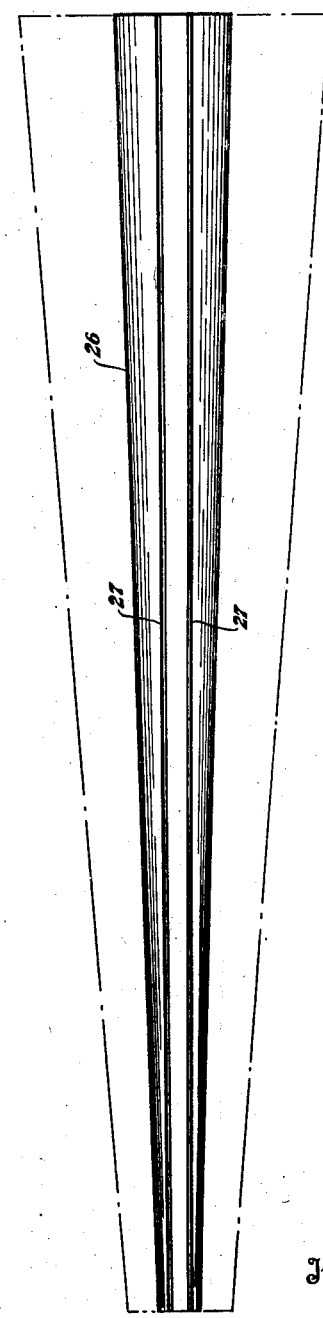
Inventors
C. A. Frahm
E. W. Riemenschneider
by Harry Frease, Attorney

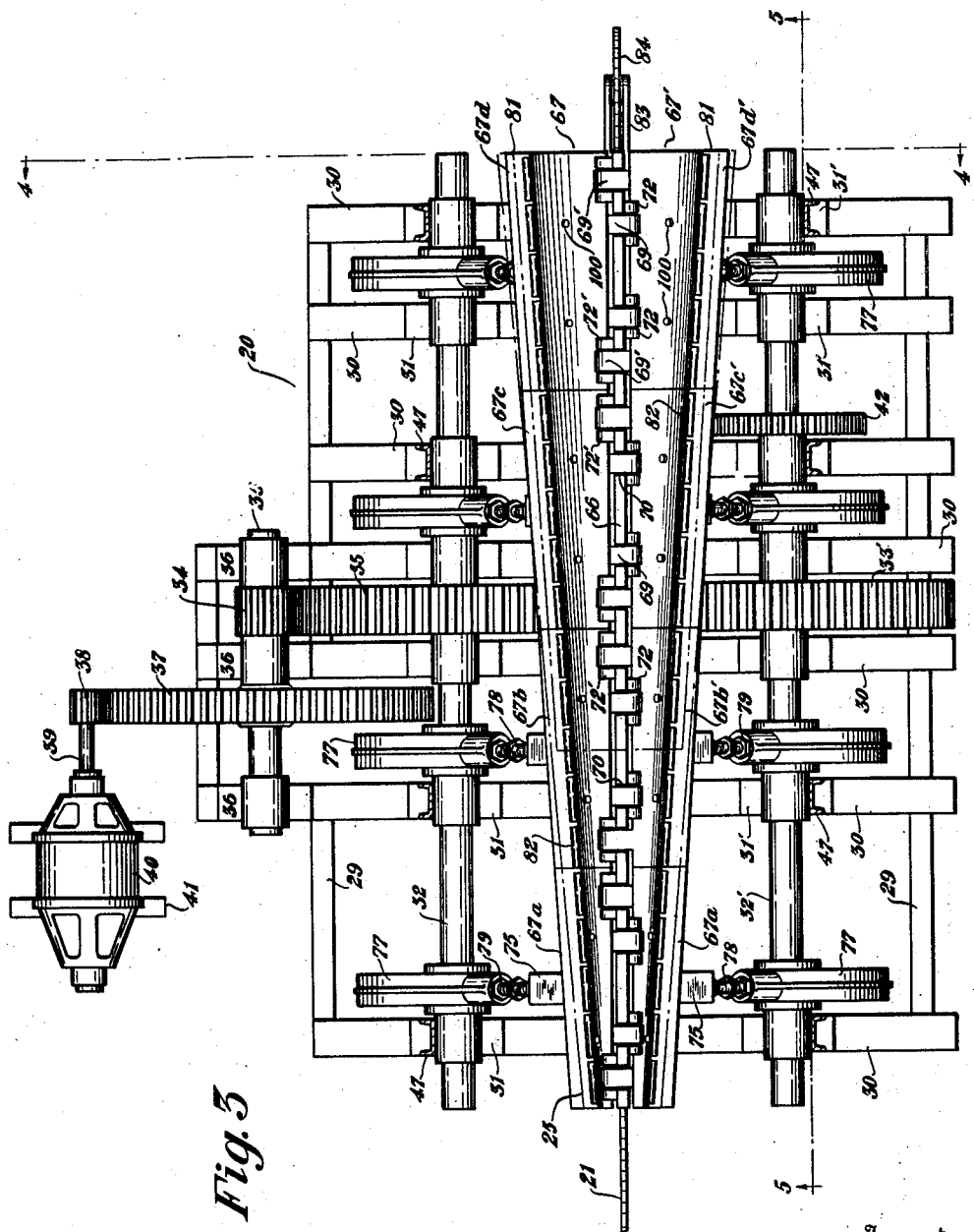

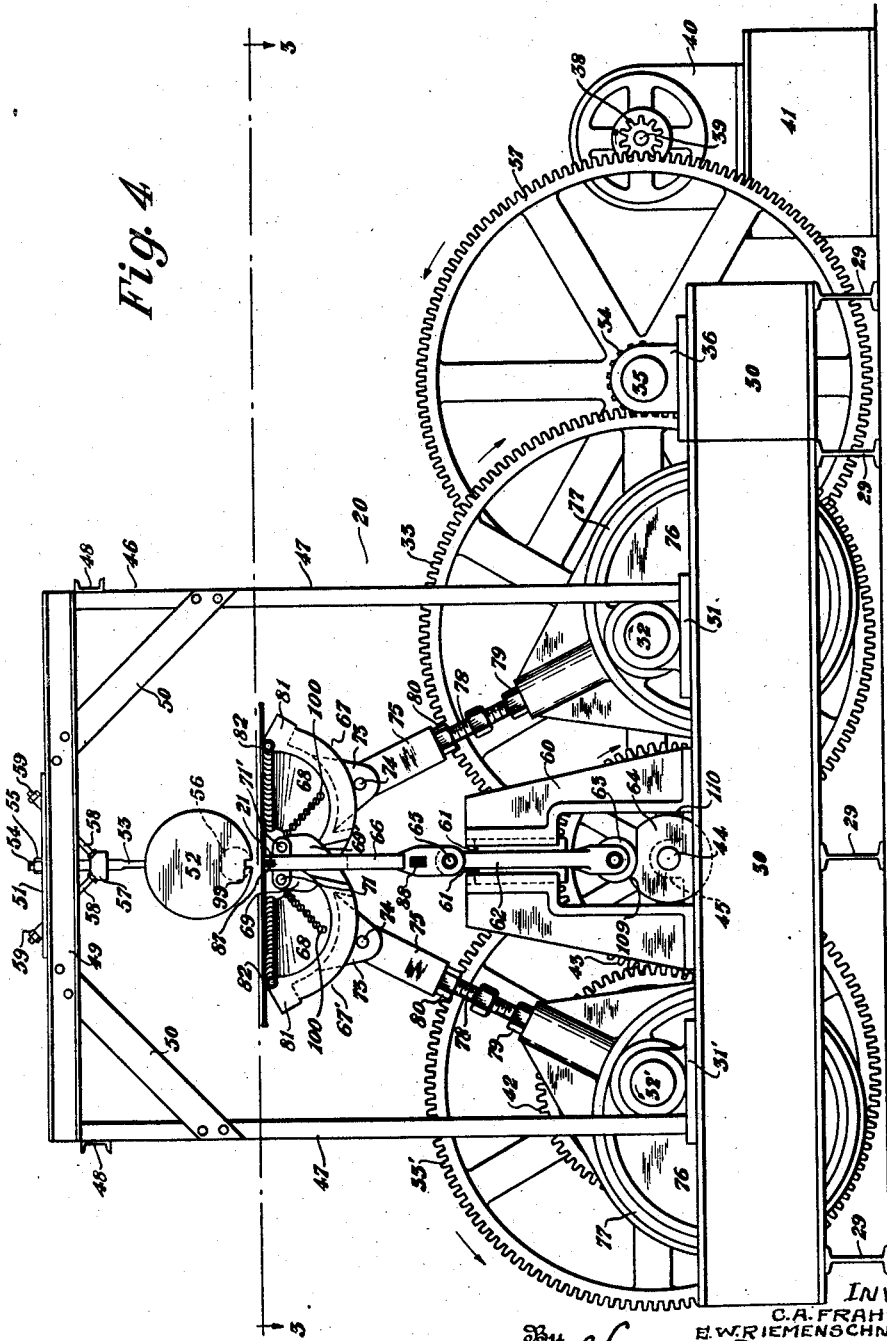

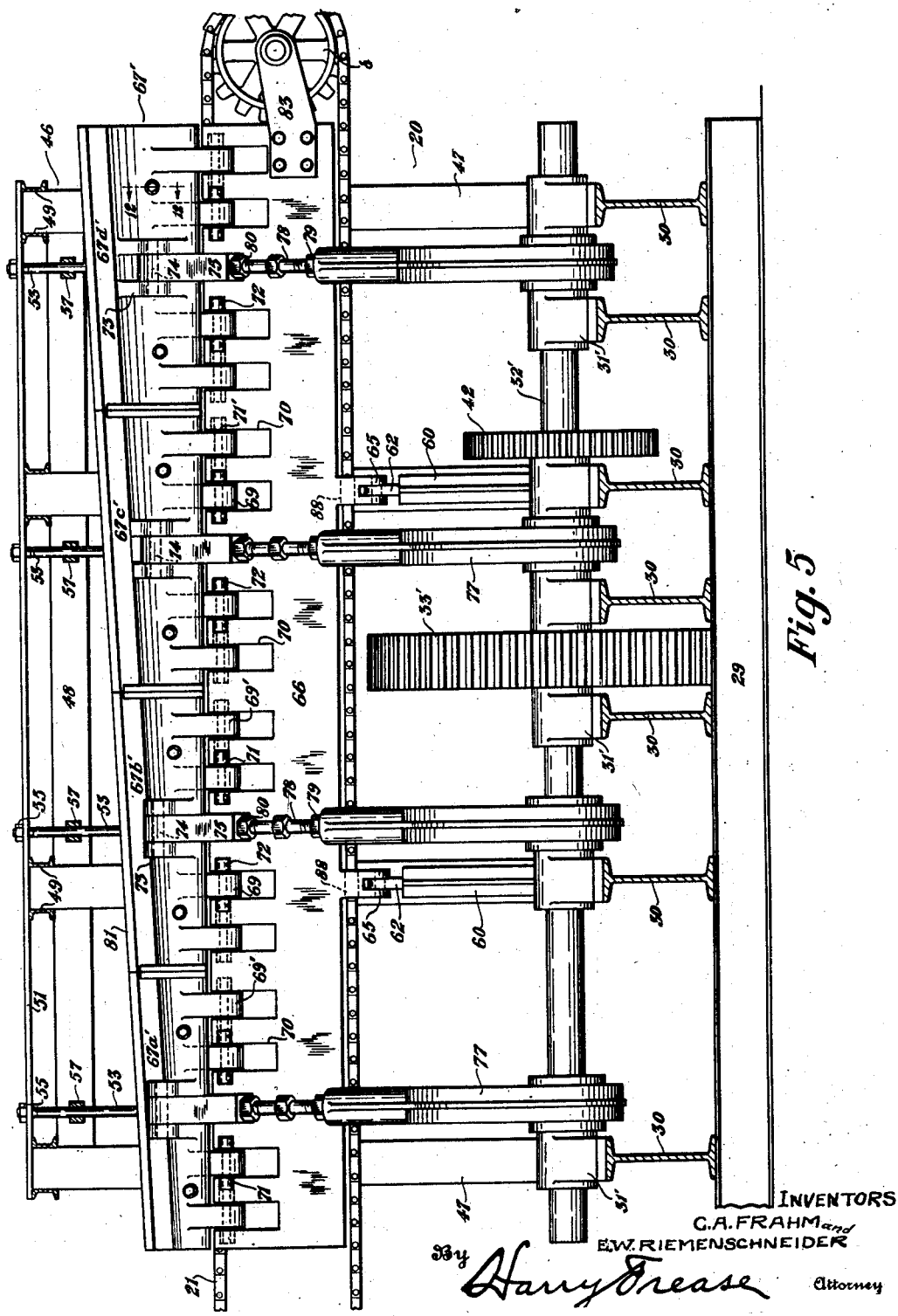

Feb. 28, 1933. C. A. FRAHM ET AL 1,899,143
TUBE MANUFACTURE
Filed Feb. 18, 1929 6 Sheets-Sheet 5

Inventors
C. A. Frahm
E. W. Riemenschneider
By Harry Frease, Attorney

Feb. 28, 1933.    C. A. FRAHM ET AL    1,899,143
TUBE MANUFACTURE
Filed Feb. 18, 1929    6 Sheets-Sheet 6
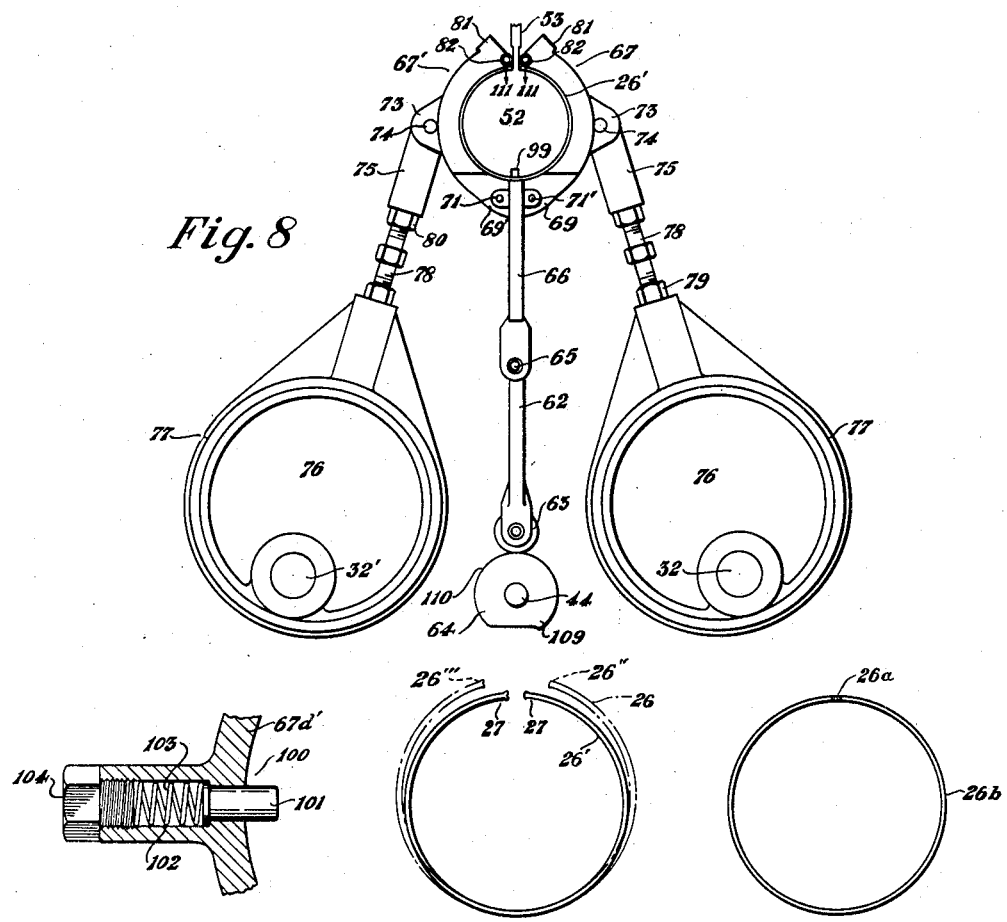
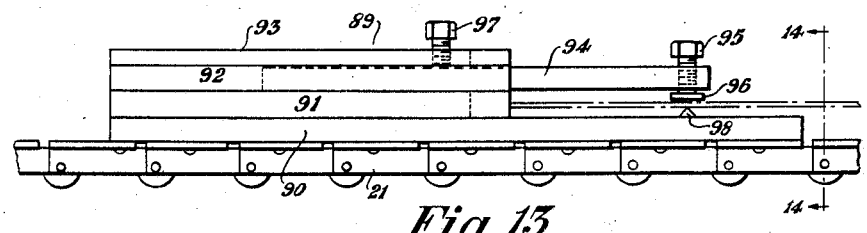
Inventors
C. A. Frahm
E. W. Riemenschneider
By Harry Frease
Attorney Patented Feb. 28, 1933

1,899,143

UNITED STATES PATENT OFFICE

CARL A. FRAHM, OF MASSILLON, AND EDMUND W. RIEMENSCHNEIDER, OF CANTON, OHIO, ASSIGNORS TO THE UNION METAL MANUFACTURING COMPANY, OF CANTON, OHIO, A CORPORATION OF OHIO

TUBE MANUFACTURE

Application filed February 18, 1929. Serial No. 340,910.

The invention relates to the manufacture of tubes such as poles, columns and shafts from metal sheets, strips or plates, and adapted for use as pillars, posts, standards, and telephone, telegraph, transmission and trolley pole; and is an improvement upon the patent of Edmund W. Riemenschneider, No. 1,746,281 dated February 11, 1930.

In making tubular poles according to the method and by the apparatus set forth in the above indicated patent, tapered tubular poles may be manufactured with a length and diameter substantially the same as wooden poles in common use for carrying telephone, telegraph, transmission or trolley wires.

However, if the length of such a pole is materially increased, the ratio of its bottom diameter to its top diameter is correspondingly materially increased; or if the length of such a pole is substantially the same but the taper of the pole is increased, by providing a smaller top diameter or a larger bottom diameter, the ratio of its bottom diameter to its top diameter is similarly increased.

If poles having such an increased bottom-top diameter ratio were to be made in apparatus such as set forth in Patent No. 1,746,281, the partial formation thereof in the initial forming funnel would require the funnel to have a diameter equal to or slightly greater than the bottom diameter of the pole to be formed. Thus the partially formed pole passing from the initial forming funnel, although having its bottom or large diameter portion substantially completely formed, would have its top or small diameter portion only slightly curved because of the great difference in width of the bottom portion of the sheet metal blank and the top portion thereof.

The completion of the formation of such a partially formed pole in the final forming mechanism disclosed in Patent No. 1,746,281, therefore requires a major portion of the work to be performed by the top or small end of the final forming mechanism while little if any work is required to be done by the bottom or large end of the final forming mechanism.

Such an unequal distribution of work to be performed by the final forming mechanism causes spoiling or destruction of some of the tubes formed therein because of the extreme curvature which must be given to the smaller end of the tube.

Moreover, the free edges of the partially formed tube coming from the primary forming mechanism are not equidistant apart throughout the length of the tube, thus causing extreme difficulty in bringing and holding such edges in close proximity for welding the same together as the tube passes from the exit end of the final forming mechanism.

The object of the present improvement therefore is to provide for the manufacture, from a single sheet or strip of metal, of tubes having unusual lengths of from thirty to fifty-five feet, more or less; and having for a pole of say forty feet in length, a bottom diameter of say eighteen inches (18") and a top diameter of say five inches (5"). Thus the ratio between the bottom diameter and top diameter is eighteen to five.

Likewise, an object of the present improvement is to provide for the manufacture of tubes shorter or longer than thirty or fifty-five feet but having a bottom-top diameter ratio approximating or greater than eighteen to five.

Another object of the present improvement is to provide means for initially forming a tube to substantially the desired finished curvature at every point throughout its length to bring the free edges thereof into substantially adjacent alignment.

Tubes having such lengths and diameters as above described, in order to withstand very large transversely applied loads must be formed from metal of the heavier gauges, and more especially of metal having a gauge ranging from fourteen gauge to three gauge; although if a weaker or stronger pole may be desirable, the gauge of the metal may be more or less than just set forth.

Therefore, a further object of the present improvement is to provide a method of and apparatus for manufacturing tubes from a single sheet, strip or plate of metal of the heavier or thicker gauges.

A number of ways in which the above objects might be accomplished have been suggested, as follows:

1. Apparatus might be constructed having a mandrel punch, a half rounded bottom die and two quarter rounded side dies, by means of which a flat sheet blank would first be punched downward into the bottom die by the mandrel punch, semi-circularly forming the bottom half of the tube, and then the side dies would be moved inward around the top half of the mandrel punch to complete the formation of the tube.

In the operation of such apparatus the friction losses developed between the dies and the material being worked is very great. Moreover, exceedingly great die pressures are necessary in the operation of such apparatus since the point of application of force, by either the bottom or the side dies upon the sheet, is always at a distance equal to or less than the radius of the mandrel punch plus the thickness of the sheet blank plus clearance from the fulcrum point about which the sheet blank is being formed.

For these and other reasons the construction and design of such a machine is exceedingly costly since the parts must be of massive size and rugged construction in order to withstand the stresses and strains set up in maintaining the large forces necessary to be applied to the blank to form the tube; and the operation of the machine is very inefficient due to the large amounts of power wasted by friction losses.

2. Another type of apparatus might be provided including two half round side dies and a mandrel punch. In such apparatus the sheet blank is initially formed semi-circularly by punching the same downward between the side dies by the mandrel acting as a punch. The side dies then are moved inwardly against the mandrel to complete the formation of the tube.

In this type of machine the friction losses developed between the dies and the material being worked are also very great, and the point of application of force upon the sheet blank for producing the bending or forming thereof can never be a greater distance from the fulcrum point about which the sheet is bent, than the radius of the mandrel punch plus the thickness of the sheet plus clearance.

This type of apparatus therefore has a prohibitive cost since it must be massive enough to withstand stresses and strains set up in and between its working parts in applying the forces and pressures necessary to form the pole; and the operation of such apparatus is very inefficient and therefore unnecessarily expensive because of large amounts of power consumed to overcome friction losses.

3. Still another type of apparatus might be constructed in which two side acting dies operate to form a tube against a mandrel maintained in position between the dies, similar in operation to what is known as a beading operation. This requires the sheet blank to be given a sharp initial curvature at its free longitudinal edges in order that the closing of the side dies will cause the free edges to slide upward along the dies, the blank being bent about the mandrel as a fulcrum.

In this type of machine the friction losses are very great, the extra operation of curving the free edges is necessary, there is a tendency to buckle the sheet blank because of its heavy gauge and extreme length, and there is an unequal distribution of work, an unequal distance of travel of each of the various die actuating working parts along the length of the dies, and a different size and design of each and every similar working part.

For these reasons such a machine not only is prohibitive in cost, but also is inefficient in operation.

Moreover, any of the types of apparatus described above, which under difficulties might be used to attain the desired objects, will set up compressional forces within the sheet blank as the same is being formed, which forces are a detriment rather than a benefit and cause buckling, wrinkling or warping of the sheet blank, thereby spoiling the same and adding unnecessarily to the item, waste, a factor which increases the cost of production of the tubes.

And finally, any of the said types of apparatus will in operation spoil or otherwise be destructive to the free edges of the sheet blank operated upon, which edges are preferably cold rolled and thickened to facilitate welding the same together after the tube has been formed.

The objects of the present invention may, however, be readily, easily and expeditiously attained by providing a machine comprising a mandrel, and longitudinally hinged movable roller edged jaw-dies cam or eccentric operated for closing the same around the mandrel, to wrap a sheet blank around the mandrel.

In this type of apparatus, the forces applied to the sheet for wrapping the same around the mandrel will all be applied to the sheet at a point of maximum leverage. Consequently, minimum forces are required to be applied to the sheet blank and therefore the working parts will have a minimum size and weight and resulting minimum cost.

Moreover, little if any friction loss will be present in the operation of wrapping the sheet about the mandrel because of the roller contact between the jaw-dies and the sheet blank. The roller contact between the jaw-dies and the sheet blank also causes the forces or pressures transmitted to the sheet blank always to be applied perpendicularly to the plane of that portion of the sheet blank contacting with the jaws. Thus no compressive forces are applied to the sheet blank which will cause buckling or wrinkling thereof.

And finally, the movement, travel, design, size, and operation of the parts forming the operating mechanism for the jaw-dies are all the same from end to end along the length of the machine, further simplifying its construction and reducing the initial cost thereof.

The fully curved product coming from such mandrel and jaw-die mechanism may then be passed through final forming mechanism such as disclosed by the Edmund W. Riemenschneider Patents No. 1,765,384 and No. 1,746,281 for bringing the edges of the product closely together in edge abutting alignment; the aligned free edge abutted edges of the product may then be welded together in a manner set forth in the Frahm and Riemenschneider Patent No. 1,765,368, and if desired the tube thus formed may be cold rolled or strengthened by fluting by the method disclosed in the Frahm and Riemenschneider Patent No. 1,777,080, and such fluting may be carried out upon a machine somewhat similar to that shown in the Frahm Patent No. 1,605,628, of November 2, 1926.

Figure 7:
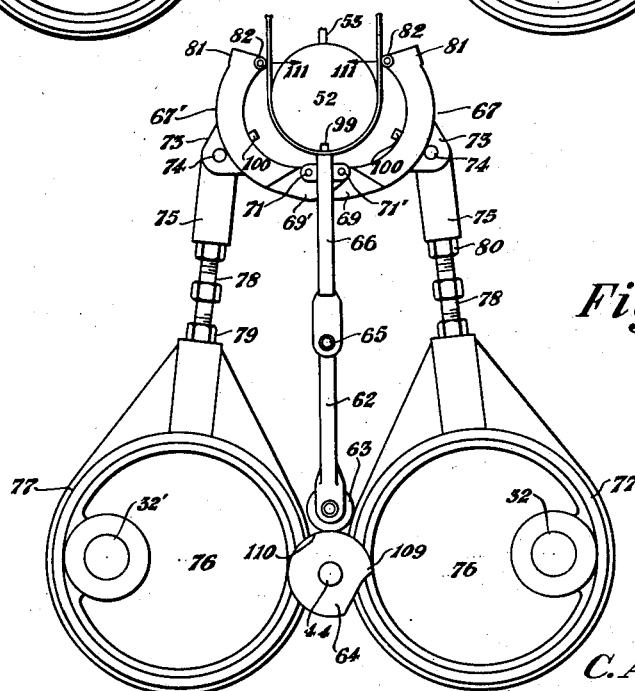

A preferred embodiment of the present invention is illustrated in the accompanying drawings in which Figure 1 is a plan view of the improved apparatus for manufacturing tapered tubular poles;

Fig. 2, a side elevation of the same;

Fig. 3, a plan sectional view of the jaw-die wrapping apparatus taken as on the line 3—3, Fig. 4; showing the jaw-dies in open position with a sheet blank shown in dotted lines in position for being operated upon;

Fig. 4, an end elevation section of the jaw-die wrapping apparatus looking at the large end of the mandrel as on the line 4—4, Fig. 3, showing the jaw-dies in open position with a sheet blank resting thereon;

Fig. 5, an elevation section of the jaw-die wrapping apparatus taken as on the line 5—5, Fig. 3, showing the jaw-dies in closed position;

Fig. 6, a partially diagrammatic end elevation of the mandrel, jaw-dies, and cam operating mechanism therefor, showing the position of the various parts just after the mechanism has commenced to operate to wrap a sheet blank about the mandrel;

Fig. 7, a view similar to Fig. 6 showing the position which the various parts assume after the sheet has been partially wrapped about the mandrel;

Fig. 8, a view similar to Fig. 6 showing the sheet blank completely wrapped about the mandrel.

Fig. 9, a plan view of the formed tube after it has been removed from the mandrel with the outline of the original flat sheet blank shown in dot-dash lines;

Fig. 10, a transverse section showing the curvature of the formed product in the position it assumes after it has just been completely wrapped about the mandrel as shown in Fig. 8; the position to which the curved free edges thereof spring after being removed from the mandrel being shown in dotted lines;

Fig. 11, a transverse section through a tubular pole after the same has passed through the final forming mechanism and after the free edges of the same have been welded together;

Fig. 12, a sectional view through one of the jaw-die loosening plungers as on the line 12—12, Fig. 5;

Fig. 13, a side elevation of a stop clamp for the sheet blank chain conveyor which feeds and discharges the jaw-die apparatus; and Fig. 14 an end elevation section showing the stop clamp in position attached to the chain conveyor, taken as on the line 14—14, Fig. 13.

Similar numerals refer to similar parts throughout the drawings.

The apparatus comprises generally, a tube forming jaw-die mechanism indicated generally at 20, including suitable charging and discharging means such as a chain conveyor 21 cooperating with the charging and discharging platforms or feed table 22; and a final tubular expansible die mechanism indicated generally at 23, including suitable welding means 23a and feed means such as the draw bench 24, for pulling the blanks therethrough.

The final tube forming mechanism 23 including the associated draw bench 24 is preferably constructed and operated in a manner shown and described in the Riemenschneider Patent No. 1,746,281 above referred to.

As shown in Figs. 1 and 2 the jaw-die and final forming mechanisms may be located in alignment for expediting the movement of material from a blank form to a finished form through the mechanisms. This movement of material through the mechanisms will be as follows:

Sheet blanks such as indicated at 25 are placed on the feed table 22, and are then conveyed into the jaw-die forming mechanism 20, by the conveyor 21, after which the forming mechanism is operated to form a fully curved tube product such as shown at 26 in Figs. 9 and 10.

The fully curved tube 26 is then withdrawn from the initial forming mechanism 20 by the chain conveyor 21, and is passed from the feed table 22 to the final forming mechanism 23, in which the free edges 27 of the partially formed tube 26 will be brought closely together in alignment and may be welded as at 26a as the tube passes from the small end 28 of the final forming mechanism 23 to form the finished tube 26b shown in Fig. 11.

The initial forming jaw-die mechanism generally indicated at 20 is supported on longitudinally extending girders 29 which are positioned on any suitable foundation and may support the cross beams 30.

A pair of bearing blocks 31 and 31' are mounted on each cross beam 30, and a pair of shafts 32 and 32' are journaled in the bearing blocks 31 and 31' in parallel relationship with each other.

The shaft 32 is provided intermediate its ends with a gear 33 which meshes with the gear 33' similarly located on the shaft 32', and the gear 33 may be driven by a pinion 34 fixed on the shaft 35, journaled in bearings 36, which may also be mounted on the cross beams 30.

The shaft 35 also has fixed thereon a driving gear 37 which meshes with a driving pinion 38, fixed on the drive shaft 39 of the mechanism drive motor 40, which is supported on a suitable base 41.

When the motor 40 is operated to rotate the gearing 33, 34, 37 and 38, the direction of rotation of the various gears is as shown by the arrows in Fig. 4 of the drawings.

The shaft 32' may also have fixed thereon a gear 42 which meshes with a gear 43 mounted on a shaft 44 centrally disposed between the two shafts 32 and 32' and journaled in suitable bearings 45 also mounted on the cross beams 30.

A mandrel supporting superstructure generally indicated at 46 may also be carried by the cross beams 30, and may include column channels 47 extending upwardly from each cross beam 30 adjacent the bearing blocks 31 and 31'.

The tops of the column members 47 may be connected by the longitudinal channels 48, and each pair of columns 47 may be connected by cross channel members 49, to form a rigid structure. The cross channel members 49 may be braced to the column members 47 as by members 50. A mandrel supporting plate 51 may be longitudinally mounted on the cross members 49.

The endwise-free stationary mandrel 52 is suspended from the plate 51 by rods 53 which are threaded at their upper ends as at 54, for attaching nuts 55 thereto which bear against the upper surface of the plate 51. The nuts 55 therefore provide means for vertically adjusting the position of the mandrel 52.

As shown in Fig. 4 the tapered mandrel 52 has its lowermost element parallel with the axes of the shafts 32, 32' and 44, as is indicated by the position of the small end of the mandrel shown in dotted lines at 56 in Fig. 4.

For preventing lateral displacement of the rigidly-supported mandrel 52, there is provided a sleeve bearing 57 for each rod 53 adjustably mounted on the lower ends of the angular rods 58 which are adjustably connected with the mandrel supporting plate 51, at 59.

Slide bearings 60 are mounted on a number of the cross beams 30 as shown in Figs. 4 and 5. Each pair of slide bearings has slidably mounted therein two slide plates 61, which extend laterally from links 62. The links 62 are thus mounted for vertical rectilinear motion within the bearings 60. The lower end of each link 62 has journaled therein a cam follower roller 63 which is adapted to contact with the cam 64 fixed on the shaft 44 adjacent each link 62.

To the upper end of the links 62 is pivoted at 65, the jaw bar 66 which extends longitudinally of the jaw-die mechanism and is centrally disposed below and parallel with the lowermost element of the mandrel 52 and is also parallel with the shafts 32 and 32'.

The jaw bar 66 has a length substantially equal to the length of the mandrel 52.

The jaw bar 66 provides mounting means for the jaw-dies indicated generally at 67 and 67'. These jaw-dies are concavely, conically curved as shown at 68 conforming with the exterior contour of the tapered mandrel 52; and because of their extreme length the jaw-dies are preferably made in sections, the jaw-die 67 being shown as including the sections 67a, 67b, 67c and 67d while the jaw-die 67' is composed of the sections 67a', 67b', 67c' and 67d'.

The jaw-die sections may be provided with hinge arms 69 and 69' which extend through slots 70 in the upper edge of the jaw bar 66, and the hinge arms 69 and 69' are pivotally hinged as at 71 and 71' between spaced ears 72 and 72' which extend laterally from each side of the jaw bar 66 adjacent each slot 70.

By referring more particularly to Figs. 3 and 4 it will be seen that the right hand jaw-die 67 has its hinge pivot point 71 on the left hand side of the jaw bar 66 while the hinge pivot point 71' of the left hand jaw-die 67' is to the right of the jaw bar 66 for reasons which will be later explained.

Each jaw-die section is also provided with a pair of spaced lugs 73 to which is pivoted as at 74, the link 75.

Each shaft 32 and 32' has fixed thereto a plurality of eccentric disks 76, the number of disks on each shaft corresponding to the number of sections which go to make up each jaw-die 67 or 67'. The eccentric disks 76 have journaled thereon the eccentric straps 77 which are connected with the links 75 by the double ended right and left hand threaded studs 78, and locking jam nuts 79 and 80 are provided adjacent the eccentric straps 77 an the links 75, for locking the connections thereof with the studs 78.

The studs 78 and jam nuts 79 and 80 provide means for adjusting the position of the jaw-dies 67 and 67' relative to the eccentric straps 77.

The free longitudinal edges 81 of the jaw-dies 67 and 67' have journaled therein rollers 82 for reasons which will be hereinafter described.

At one end of the jaw bar 66 there may be provided a bracket 83 in which is journaled a chain conveyor idler sprocket wheel 84. A chain conveyor drive sprocket wheel 85 is provided at the opposite end of the feed table 22 and may be driven by a reversing motor 86, as shown in Figs. 1 and 2.

The endless chain conveyor 21 is mounted on the sprockets 84 and 85 and passes along the top of the feed table 22, through a slot 87 in the upper edge of the jaw bar 66 around the sprocket 84 back through slots 88 provided in the lower portion of the jaw bar 66, underneath the feed table 22 and around the sprocket 85.

The chain conveyor 21 may have provided thereon a plurality of clamps generally indicated at 89, and best shown in Figs. 13 and 14, each of which may include a bottom bar 90 adapted to be attached to the chain conveyor 21. Above the bottom bar 90 is secured a gauge bar 91, spacer bars 92, and a top bar 93.

Between the spacer bars 92, the top bar 93, and the gauge bar 91, is slidably mounted a clamp bar 94. In one end of the clamp bar 94 may be threaded the set screw 95 having a disk 96 swivelled at its lower end. Another set screw 97 may be provided in the top bar 93 for securing the clamping bar 94 relative to the chain conveyor. In the upper surface of the bottom bar 90 there is a conical upwardly pointed projection 98.

The underside of the mandrel 52 is grooved or slotted as at 99 for permitting the clamps 89 to pass along the underside thereof when the chain conveyor is operated by rotation of the motor 86.

Each jaw-die section may be provided with a plurality of loosening plungers generally indicated at 100 for a purpose to be hereinafter described. These loosening plungers 100 are best shown in Fig. 12 and may include a plunger rod 101 mounted in a recessed bore 102 provided in the side walls of the jaw-dies 67 and 67'. Each plunger rod may be spring pressed by the spring 103 retained within the recessed bore by the threaded plug 104.

The operation of the apparatus for initially forming a tube is as follows:

A tapered sheet blank 25 may be placed on the feed table 22 and be laterally centered thereon as by the gauges 105 and 106. The blank may then be longitudinally clamped to the conveyor 21 at each end by clamps 89.

The motor 86 is then started causing the conveyor chain to feed the sheet blank into the jaw-die mechanism longitudinally of the endwise-free rigidly supported stationary mandrel 52 until the desired longitudinal position of the sheet blank relative to the mandrel has been reached, when the motor 86 will be stopped.

The motor may be stopped automatically when the desired sheet blank position relative to the mandrel has been reached as by providing a projection 107 on the chain conveyor, as shown in Fig. 2, the projection being adapted to strike switch operating means 108 for controlling the operation of the motor 86.

The sheet blank 25 is now in position both longitudinally and laterally of the tube forming jaw-die mechanism 20 for being formed thereby, as shown in Figs. 3 and 4.

The drive mechanism motor 40 is then started causing a rotation of the shafts 32, 32' and 44.

Just before the rotation of the shaft 44 has begun, the cam 64 is in the position shown in Fig. 4 and immediately after rotation of the shaft has begun, the high spot 109 of the cam 64 causes an upward motion of the links 62, thereby raising the jaw bar 66 to the position shown in Fig. 6.

The sheet blank is not, however, clamped between the lowermost element of the mandrel and the jaw bar for the reason that variations in thickness of the sheet might cause breaking of some of the working parts of the machine if such relation were to be maintained. For this reason at this point in the operation, a clearance is desirable if not necessary between the top surface of the sheet blank and the lowermost element of the mandrel, the sheet, however, resting longitudinally centrally on the jaw bar.

Meanwhile rotation of the shafts 32 and 32' causes the centers of the eccentric disks 76 to move inwardly and slightly upwardly to the position shown in Fig. 6 thereby raising the jaw-dies at the same time that the jaw bar is raised as above described.

Further rotation of the shafts 32, 32' and 44 maintains the jaw bar in the same position since the cam follower roller 63 merely rides along the high portion 110 of the cam 64; but the eccentric disks 76 continue to have their centers moved upwardly causing a closing motion to be transmitted to the jaw-dies 67 and 67' which are pivoted at 71 and 71' to the jaw bar 66, until such a position of the various elements as shown in Fig. 7 has been reached. During this time, an element of the sheet blank contacts with the mandrel and remains in a fixed position relative to the mandrel, and the curving or wrapping forces are applied to the sheet blank at portions thereof laterally spaced from the fixed element.

Meanwhile the sheet blank is being effectually wrapped around the mandrel in such a manner that no friction is developed between the sheet blank and the jaw-dies at the point where force is applied to the sheet blank since this contact is a roller contact through the medium of the rollers 82. It is also to be noted that the position of this contact with the sheet blank has not materially changed relative to the sheet blank surface from the initial position to the position shown in Fig. 7.

Moreover the roller contact between the sheet blank and the jaw-dies causes the forces applied to the sheet blank to be always perpendicular to that portion of the sheet blank where the forces are applied as is shown by arrows 111 in the various figures of the drawings. The arrows 111 also show that the direction of forces change during the curving operation. This prevents any compressive stresses from being set up within the body of the sheet blank which would cause buckling or wrinkling.

It is well known, when a sheet or plate of the heavier gauges is attempted to be formed on a mandrel, that a sharp angular bend is likely to occur at the point where the blank contacts with the mandrel. If pressure is continued to be applied to portions of such a sheet blank, apex of the sharp angular bend moves away from the mandrel and the inner surfaces of the sheet blank slide along the mandrel without any appreciable curvature being given to the sheet blank.

Such an occurrence is however prevented during the operation of the present jaw-die mechanism because of the presence of the jaw bar immediately below the mandrel in close proximity with the sheet blank thereby preventing the formation of a sharp angular bend at this point. The sheet blank is, however, effectually wrapped around the mandrel.

This wrapping action may be likened unto that which would take place if a sheet of paper were laid on a table, and a cylinder were placed upon the paper with its axis parallel with the top of the table. By grasping two opposed edges of the sheet of paper and lifting the same upward, the paper will be made to contact with the lower portion of the cylinder, assuming the same curvature which the cylinder has, and the portions of the paper not in contact with the cylinder will extend tangentially therefrom.

Upon further rotation of the shafts 32, 32' and 44, the jaw bar still remains in the same relative position as before, but the jaw-dies close directly inward around the mandrel to the position shown in Fig. 8 with the sheet blank completely wrapped around the mandrel between the mandrel and jaw-dies.

It is pointed out that the time when the greatest pressure is desired for forming the sheet blank is just when the parts reach the position shown in Fig. 8, at which time the entire concave surfaces of the jaw-dies close in around the sheet blank; and at this time the greatest forces are available from the operation of the mechanism since the eccentric disks and straps 76 and 77 are just moving through the dwell, which of course increases the magnitude of the curving forces applied by the jaw-dies to a maximum, while at the same time the rate of movement thereof becomes zero.

After the position of the apparatus shown in Fig. 8 has been reached, further rotation of the shafts 32 and 32' causes the jaw-dies to open up. At this time the loosening plungers 100 come into play for preventing the formed tube from sticking to the jaw-dies when the same commence to open.

As the jaw-dies open up, the plunger rods 101 by the action of the springs 103 press against the formed tube 26 to dislodge it from the concavely, conically curved portion 68 of the jaw-dies.

Upon further rotation of the shafts 32, 32' and 44, the jaw-dies, associated jaw bar and eccentric mechanism again reach the position shown in Fig. 4, and the formed tube hangs around the mandrel, having sprung, because of the resiliency or spring action of the metal, from the finally formed position shown in Figs. 8 and 10 at 26' to the position shown at 26 in Figs. 9 and 10.

Further rotation of the shafts 32, 32' and 44 will then be stopped by stopping the motor 40. The formed tube 26 is then removed from the mandrel by starting the reversing motor 86, which will operate at this time in the direction opposite to that which it operated when the flat sheet blank was fed to the jaw-die mechanism.

Since the clamps 89 are still secured to the lower portion of the now fully curved tube 26, the tube will be removed endwise from the mandrel and will travel back to the feed table 22, the projection 107 on the chain conveyor being adapted to strike switch operating means 112 also controlling the operation of the motor 86 to stop the same when the desired position of the tube 26 relative to the feed table 22 has been reached.

The clamps 89 will then be loosened from the end portions of the tube by loosening the set screws 95 and sliding the clamp bar 94 into the receiving pocket 92a formed between the spacer bars 92, the top bar 93 and the gauge bar 91.

The fully curved tube 26 is then removed from the feed table 22 and fed to the final forming apparatus 23 by the draw bench 24 in a manner fully described in the Riemenschneider Patent No. 1,746,281, at which time the free edges 27 of the tube 26 will be brought in close edge abutted aligned contact and welded together as at 26a, a completely formed tube 26b resulting as shown in Fig. 11.

The sheet blank 25 may have its longitudinal edges 27 initially cold rolled and shaped as shown at 26″ and 26‴ for facilitating the welding of the edges together by welding means 23a in a manner set forth in our Patent No. 1,765,368. Since the cold rolled formation of the edges results in the edge portions having a thickness of substantially twice the thickness of the sheet blank, the jaw-dies 67 and 67′ and mandrel 52 must be so constructed that sufficient clearance is maintained between the jaw-dies and mandrel when the position shown in Fig. 8 is reached, to permit the cold rolled formed edges 26″ and 26‴, to extend between the mandrel and jaw-dies without injury to such edges.

Attention is drawn to the fact that the forces applied to the sheet blank when the same is being wrapped around the mandrel are applied at a point of maximum leverage. This may be readily seen by referring to Figs. 4, 6, 7 and 8 wherein the force transmitted from the rotating shafts 32 and 32′ is applied to the sheet blank at the point where the rollers 82 contact with the sheet blank, which point is spaced from the fulcrum point 71 and 71′ of the jaw-dies at a lever arm distance slightly greater than the diameter of the mandrel 52 at any particular section and the lever arm distance is also greater at any event than the radius of the mandrel plus the thickness of the sheet blank plus clearance. This lever arm distance is somewhat increased by pivoting the jaw-dies to the opposed sides of the jaw bar as explained above.

Since the forces applied to the sheet blank when the jaw-dies are acting substantially vertically upward as in Figs. 4 and 6 are applied when a maximum leverage is existing, the magnitude of the forces are a minimum, necessitating a minimum strength of mandrel and mandrel supporting structure to resist the application of the forces in a vertical plane.

When the jaw-dies 67 and 67′ commence to close in around the mandrel as for instance when the jaw-dies reach the position shown in Fig. 7, the forces are substantially horizontal and balance each other since they are applied from opposite sides of the mandrel by the jaw-dies 67 and 67′. At this time and at the time when the forces are maximum as above described when the eccentric disks and straps 76 and 77 are moving through the dwell as shown in Fig. 8, the mandrel supporting structure is not required to resist such maximum forces since the same are opposed to each other rather than being borne by the mandrel supporting structure.

It is, of course, understood that the jaw-die mechanism may have any desired length by providing any number of jaw-dies sections at one end or the other of the mechanism, four sections only being shown in the drawings for purposes of illustration.

Likewise the specific taper of the mandrel and jaw-dies shown in the drawings may be varied within certain limits according to the desired capacity for forming tubes of various lengths and diameters.

Also, the initial shape of the blank formed on the mandrel is not necessarily as shown in dot dash lines in Figs. 3 and 9 but may have an initial shape as shown in dash double dot lines in Fig. 3.

It is also understood that a cylindric mandrel and cylindric jaw-dies might be provided which would be used to readily, easily and efficiently form a cylindric tube rather than a tapered tube as shown in the drawings.

In the claims appended hereto, the expression "sheet metal" is intended to include strips and plates as well as sheets of metal, and the term "tube" is intended to include any article having a tubular cross section.

We claim:

1. The method of making a tube from a single sheet of metal which consists in curving a sheet blank around a mandrel, by maintaining an element of the sheet blank in a fixed position relative to the mandrel, applying forces to the blank at portions thereof laterally spaced from the fixed element, the lever arm of the forces being initially greater than the diameter of the mandrel, decreasing the lever arm of the forces to increase the magnitude thereof as the curving operation nears completion, then bringing the edges of the curved blank closely together in alignment, and then welding together the aligned edges.

2. Apparatus for forming sheet metal tubes, including a mandrel, a movable jaw bar mounted adjacent the mandrel, jaw-dies pivotally mounted on the jaw bar, and cooperating means for moving the jaw bar and for applying a steadily increasing force to the jaw-dies for closing the jaw-dies to wrap a sheet blank around the mandrel.

3. Apparatus for forming sheet metal tubes, including a mandrel, a jaw bar movably mounted adjacent the mandrel, jaw-dies pivotally mounted on the jaw bar, and cam means for moving the jaw bar toward the mandrel and eccentric means for applying a steadily increasing force to the jaw-dies for closing the jaw-dies to wrap a sheet blank around the mandrel.

4. Apparatus for forming sheet metal tubes, including a mandrel, a jaw bar mounted adjacent the mandrel, jaw-dies each pivoted to one side of the jaw bar and extending from the other side thereof, and means for closing the jaw-dies to wrap a sheet blank around the mandrel.

5. Apparatus for forming sheet metal tubes, including a mandrel, jaw-dies pivoted adjacent the mandrel, means for closing the jaw-dies to wrap a sheet blank around the mandrel, and means for dislodging the formed sheet blank from the jaw-dies when the same are opened.

6. The method of making a tube from a sheet metal blank which includes curving the blank by wrapping it around an endwise-free rigidly-supported stationary mandrel, then removing the formed tube endwise from the mandrel, then bringing the edges of the curved blank closely together in edge abutting alignment, and then welding together the edge abutted aligned edges.

7. The method of forming a tapered tube which includes curving a tapered sheet metal blank around a tapered mandrel by applying forces to the blank whose directions are changing during the curving, but which are always perpendicular to the portions of the blank where the forces are applied, and then removing the curved blank endwise from the mandrel.

8. The method of forming a tapered tube which includes curving a tapered sheet metal blank by wrapping it around a tapered mandrel so that the uncurved portions of the sheet blank extend substantially tangentially from the mandrel during wrapping and applying the curving forces to the uncurved portions of the sheet blank at places spaced from the contact of the sheet blank with the mandrel, and then removing the formed tube endwise from the mandrel.

9. Apparatus for forming a tube from a sheet metal blank, including an endwise-free mandrel, means located laterally of the mandrel and extending along the working length of the mandrel rigidly supporting the mandrel at one side thereof, jaw-dies operatively mounted for wrapping the blank around the mandrel, and means for removing the formed tube endwise from the mandrel.

10. The method of making a tapered tube from a tapered sheet metal blank which includes curving the blank by wrapping it around on endwise-free rigidly-supported stationary tapered mandrel, then removing the formed tapered tube endwise from the tapered mandrel, then bringing the edges of the curved tapered blank closely together in edge abutting alignment, and then welding together the edge abutted aligned edges.

In testimony that we claim the above, we have hereunto subscribed our names.

CARL A. FRAHM.
EDMUND W. RIEMENSCHNEIDER.